United States Patent

[11] 3,580,388

| [72] | Inventor | Baird E. Resener<br>Indianapolis, Ind. |
|---|---|---|
| [21] | Appl. No. | 803,776 |
| [22] | Filed | Mar. 3, 1969 |
| [45] | Patented | May 25, 1971 |
| [73] | Assignee | Amsted Industries Incorporated<br>Chicago, Ill. |

[54] ATTACHMENTS FOR A FLEXIBLE BELT
8 Claims, 6 Drawing Figs.

[52] U.S. Cl. .................................................. 198/198,
198/176
[51] Int. Cl. ................................................... B65g 15/42,
B65g 19/00
[50] Field of Search .......................................... 198/198,
199, 195, 197, 176

[56] References Cited
UNITED STATES PATENTS

| 1,065,282 | 6/1913 | Tall ............................ | 198/199 |
| 1,532,017 | 3/1925 | Wry ............................ | (198/198UX) |
| 2,792,928 | 5/1957 | Holz ........................... | 198/200 |
| 2,276,978 | 6/1940 | Himan et al. ................ | 198/176 |

FOREIGN PATENTS

| 1,129,464 | 9/1956 | France ........................ | 198/198 |

*Primary Examiner*—Gerald M. Forlenza
*Assistant Examiner*—Jerold M. Forsberg
*Attorneys*—Walter L. Schlegel, Jr. and John W. Yakimow ABSTRACT: A wire member is secured to a belt by tangs projecting into holes in the sides of the belt. Attachments are secured to the wire member proximate the upper surface of the belt. The belt may have notches in its sides to retain the wire member flush with the side of the belt.

PATENTED MAY 25 1971 3,580,388
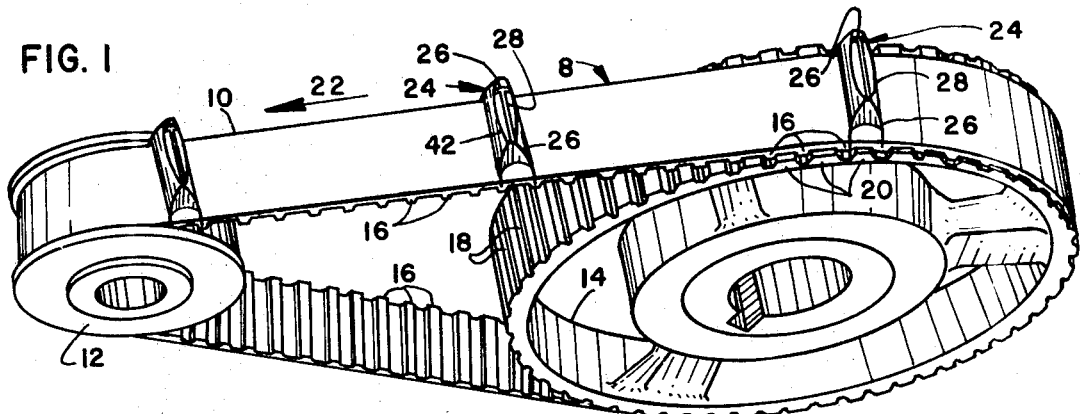
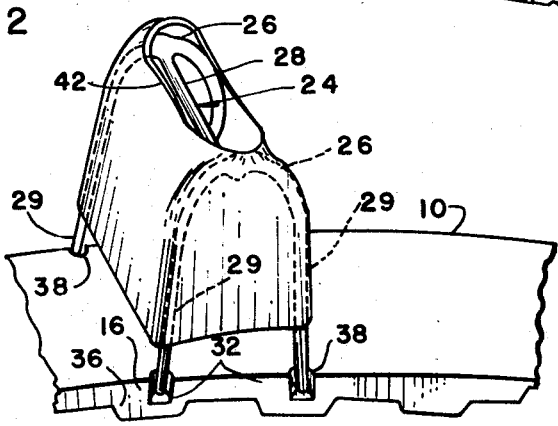
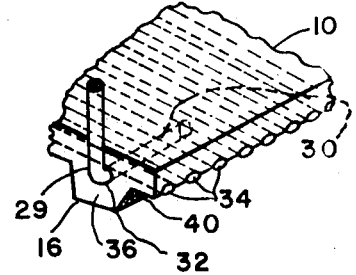
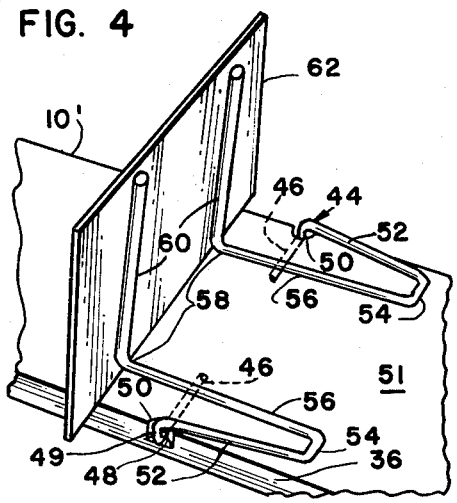
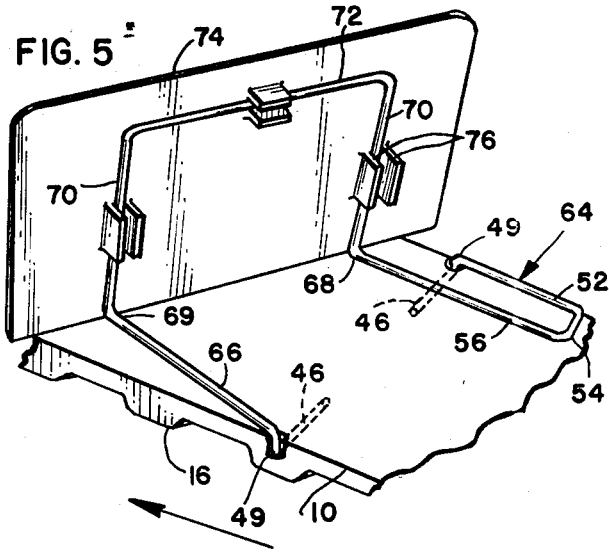
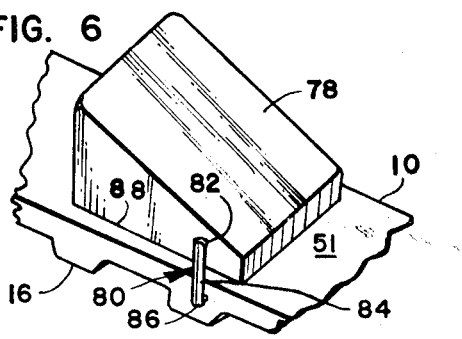
*INVENTOR.*
BAIRD E. RESENER
BY
John W. Yakimow
ATTY'S

ATTACHMENTS FOR A FLEXIBLE BELT

This invention relates to material handling conveyors, particularly, means for securing attachments to flexible belt conveyors.

Many light duty material handling operations may be performed by toothed or "timing" belts having suitable attachments. Known methods of securing an attachment to a belt are generally unsatisfactory. Among these known securing methods are riveting, cementing and vulcanizing. Riveting requires grooves in the pulleys to accept the projecting rivet heads resulting in extra expense. Neoprene and other materials used in belts do not readily accept glues. Furthermore, as a belt passes around a pulley the outer surface of the belt lengthens and tends to peel the glue away from the belt. Vulcanizing elastomeric members to a belt works but requires expensive molded parts that are difficult to remove once attached.

The present invention contemplates a wire form matrix having inwardly projecting tangs. The tangs are engaged in holes located on opposite sides of a belt. Each hole may be located in a tooth of the belt. The wire matrices may be spring biased to grip the belt. Grooves may be provided adjacent the wire on the sides of the belt to receive the wire and retain it flush with the sides of the belt.

The wire form matrix may project upwardly above the upper surface of the belt. Various attachments may be secured to the upper portion by gripping, clipping, glueing, welding or the like. Interchangement of attachments may be quickly and easily made by either removing the tangs from the holes and inserting tangs from another wire matrix and attachment, or by removing an attachment from the matrix and, for example, clipping a new attachment on the matrix. The distance between the attachments may also be readily changed by moving the tangs to other holes.

If desired, a wire matrix may have two or more legs on each side of the belt interconnected by a wire member. A tang on each leg may be engaged in a hole located in a tooth. The holes may be located below the pitch line of the belt and below the tensile member, e.g., glass fiber, within the belt. As the belt flexes going around a pulley, the distance between the tangs will decrease slightly. Such decrease will be absorbed by the resiliency of the wire legs. The sides may be interconnected by an attachment or another wire.

The foregoing and other objects and advantages of the invention will become apparent from the following detailed description of the accompanying drawings forming a part hereof, wherein:

FIG. 1 is a perspective view of a material handling conveyor embodying feature of the invention;

FIG. 2 is an enlarged, fragmentary perspective view illustrating a section of the conveyor shown in FIG. 1;

FIG. 3 is a fragmentary, transparent perspective view of a toothed belt embodying features of the invention; and FIGS. 4 through 6 are fragmentary perspective views illustrating various wire form matrices and attachments secured to belts and embodying features of the invention.

Referring now to the drawings, FIG. 1 illustrates a material handling conveyor 8 comprising an endless belt 10 trained upon sprocket wheels 12 and 14 which may be secured to rotatable shafts (now shown) in a known manner. Spaced teeth 16 on belt 10 are mateably engaged with correspondingly shaped spaces 18 defined by sprockets 20 on sprocket wheels 12 and 14 as the sprocket wheels rotate. Rotation of sprocket wheels 12 and 14 moves belt 10 through an article conveying span partially illustrated by arrow 22.

Wire matrices 24 (FIGS. 1 and 2) may be secured to belt 10 in spaced relationship and comprise opposed U-shaped sides 26 interconnected by an upper brace 28. Each arm 29 of a U-shaped side 26 (FIG. 2) may have a tang 30 (FIG. 3) projecting inwardly toward the belt 10 into a hole 32 located in a tooth 16. The tangs 30 preferably project into the belt 10 below the tensile members 34, e.g., glass fiber, which are usually located at the belt's pitch line (FIG. 3). If desired the side 36 of the belt 10 may be notched at 38 for engagement of an arm 29 of a U-shaped side 26. The arm 29 may be flush with the side 36 of belt 10. The lower surface of the belt may be covered with a tough, wear-resistant fiber 40 such as nylon.

Resiliency of the wire U-shaped sides 26 and brace 28 is adequate to remove the tangs 30 from the holes 32. As the belt 10 moves around a sprocket wheel 12 or 14 the pitch line of the belt (located at tensile members 34) remains constant while the lower portion of the belt proximate the teeth 16 is compressed a slight amount. Such compression of the lower portion of U-shaped sides 26 is absorbed by the resiliency of the matrix 24. The matrix 24 is normally spring biased to grip belt 10.

A pushing surface 42 may be made from a head shrinkable plasticlike material, e.g., polyvinylchloride, polyolefin, TFE (Teflon) or Neoprene, that is snugly shrunk over the wire form matrix 24. Flat plates, cups and other attachments may also be secured to matrix 24 as will in part be hereinafter described.

FIG. 4 illustrates another wire matrix 44 comprising opposed tangs 46 engaged in holes 48 in a "V" type belt 10'. Sides 49 extend upward away from the tangs 46 and are mateably engaged in notches 50 located in the sides 36 of belt 10'. Longitudinal outer sections 52 of matrix 44 extend along the upper surface 51 of belt 10' in one direction away from the matrix's sides 49. The outer sections 52 end at bights 54 and curl back as inner longitudinal sections 56 along surface 51 of belt 10' that traverse tangs 46. The inner sections 56 then extend upwardly at 58 to form arms 60 upon which a flat plate 62 may be secured, e.g., by glueing. The U-shaped configuration on each side of matrix 44 formed by sections 52 and 56 and by bight 54 provides a springlike structure which aids in easy removal of tangs 46 from holes 48.

As illustrated, matrix 44 may not be pivoted forward or backward on belt 10'. If desired, the inner sections 56 may be shortened so that points 58 lie in line with or rearward, i.e., toward bight 54, of tangs 46. In such an arrangement plate 62 could be pivoted forward about tangs 46 against belt 10'. This latter pivotal arrangement would still support plate 62 against backward movement during forward movement of belt 10'.

FIG. 5 illustrates yet another matrix 64 similar to 44 in FIG. 4 having tangs 46 engaged in teeth 16 of belt 10. One side 49 of the matrix 64 extends upwardly from tang 46 and rearward as an outer longitudinal section 52 into a bight 54 and forward again as an inner longitudinal section 56 similar to that previously described. The other side 49 of matrix 64 extends upwardly and then projects forward along belt 10 as section 66. Sections 56 and 66 may respectively project upwardly at 68 and 69 forming arms 70 which may be interconnected by transverse portion 72.

A flat plastic pusher face 74 having spaced lugs 76 may be attached to matrix 64. The lugs 76 may be snapped about the wire, as illustrated, in a known manner. Various attachments may be quickly connected and disconnected from matrix 64. The pusher face 74, as illustrated, may be angled relative to the movement of belt 10.

FIG. 6 illustrates still another attachment 78. A wire matrix 80 may project through a hole 82 in attachment 78. The sides 84 of the matrix 80 may project downwardly and then inwardly as tangs' (previously described) which are engaged in holes 86 in belt 10. Due to the lack of resiliency of sides 84, the wire matrix may be crimped into engagement with belt 10. The flat bottom surface 88 of attachment 78 is mateably engaged with the upper surface 51 of belt 10. Two matrices 80 may be used if desired to retain attachment 78 to belt 10.

I claim:

1. In combination: a flexible belt having holes in opposed side surfaces; a flexible wire form matrix having opposed tangs projecting into certain of said holes in said flexible belt and flexible wire sides connected to and extending away from said tangs along said opposed side surfaces and above said flexible belt; and an attachment connected to said flexible wire form matrix above said flexible belt.

2. The combination set out in claim 1 wherein said opposed side surfaces of said flexible belt have grooves therein and said flexible wire sides of said wire form matrix are located in said grooves and are flush with said opposed side surfaces.

3. The combination set out in claim 1 wherein said flexible belt has spaced teeth and said holes for said tangs are located in said teeth.

4. The combination set out in claim 1 wherein tensile members are located along the pitch line of said belt and said holes for said tangs are located below said tensile members.

5. The combination set out in claim 1 wherein: said flexible belt has an upper surface; said wire form matrix includes sections connected to said sides of said matrix and extending along said upper surface of said belt and arms connected to said sections and extending away from said upper surface of said belt; and said attachment is connected to said arms.

6. The combination set out in claim 5 wherein said wire form matrix biases said tangs toward said flexible belt.

7. The combination set out in claim 5 wherein said arms are interconnected by a transverse member and said attachment is connected to said arms and said transverse member.

8. The combination set out in claim 5 wherein one of said sections extends rearward along said upper surface of said flexible belt to a bight and then curls back and extends forward along said upper surface of said belt as an inner section and said arm for said one of said sections is connected to said inner section and extends away from said upper surface of said belt.